United States Patent [19]

Norris et al.

[11] Patent Number: 4,993,943
[45] Date of Patent: Feb. 19, 1991

[54] APPARATUS AND METHOD FOR THE REMOVAL OF HIGHER AND LOWER VOLATILITY ORGANIC CONTAMINANTS FROM SOIL

[76] Inventors: David P. Norris, 685 Birch Hill Dr.; William P. Norris, 147 Warren Ave., both of Bridgewater, N.J. 08807

[21] Appl. No.: 488,745

[22] Filed: Mar. 2, 1990

[51] Int. Cl.$^5$ ............................................. F27B 7/08
[52] U.S. Cl. ................................... 432/107; 432/111; 110/110; 110/224; 110/347
[58] Field of Search ............... 110/347, 276, 110, 224; 432/107, 111

[56] References Cited

U.S. PATENT DOCUMENTS

| | | | |
|---|---|---|---|
| 2,932,713 | 4/1960 | Powers | 110/110 |
| 3,233,982 | 2/1966 | Maginn, Jr. | 432/107 |
| 3,871,829 | 3/1975 | Keith et al. | 432/107 |
| 4,206,713 | 6/1980 | Ryason | 110/347 |
| 4,451,231 | 5/1984 | Murray | 432/107 |
| 4,632,042 | 12/1986 | Chang | 110/224 |
| 4,745,869 | 5/1988 | Dilmore et al. | 432/111 |
| 4,759,300 | 7/1988 | Hansen et al. | 110/224 |
| 4,870,911 | 10/1989 | Chang et al. | 432/107 |

*Primary Examiner*—Henry C. Yuen
*Attorney, Agent, or Firm*—Lerner, David, Littenberg, Krumholz & Mentlik

[57] ABSTRACT

An apparatus for the removal of higher and lower volatility organic contaminants from media such as soil including an externally heated screw conveyor having an inlet, an outlet and one or more solid core flights, means for collecting and delivering media contaminated with higher and lower volatility organic contaminants to the screw conveyor inlet, at least one infrared radiation source external to the screw conveyor adapted to heat the media in the screw conveyor to a temperature above which at least one of the contaminants volatilize, and means for venting volatilized contaminants from the screw conveyor. A continuous process for removing higher and lower volatility organic contaminants from media such as soil including the steps of providing a source of contaminated media, agitating, manipulating and transporting the contaminated media by use of at least one screw conveyor having one or more solid core flights, heating simultaneously the contaminated media with a quantity of infrared radiation sufficient to volatilize at least one of the organic contaminants as the contaminated media is agitated, manipulated and transported by the at least one solid core screw conveyor, so that the organic contaminants are volatilized and the media is decontaminated.

48 Claims, 5 Drawing Sheets

APPARATUS AND METHOD FOR THE REMOVAL OF HIGHER AND LOWER VOLATILITY ORGANIC CONTAMINANTS FROM SOIL

BACKGROUND OF THE INVENTION

The invention relates to the field of decontamination of soil and other materials and a method and apparatus for accomplishing the purification of soil and other materials contaminated with organic materials, and in particular to the purification of soil and other materials contaminated with both higher and lower volatility organic materials.

Increasingly, the public has been made aware of some of the less desirable side effects of industrialization in the form of industrial wastes and other environmental pollutants. While neither the magnitude of contamination no the effects of the pollution are known with any degree of certainty, it is generally accepted that returning the environment to a pristine state is highly desirable.

One area of particular concern is soil decontamination. Through years of thoughtless disposal practices, large areas of soil have become contaminated by a variety of pollutants. Among the most prevalent classes of pollutants are the Volatile Organic Contaminants ("VOC"). VOC's are organic compounds or mixtures of organic compounds which can range from low boiling point, low molecular weight primary alkanes, alcohols, amines, amides, acids, sulfides, etc. through high boiling point, high molecular weight compounds such as dioxins and PCB's.

The removal of VOC's from soil has recently become the subject of a number of United States patents which are directed generally to methods and apparatus for soil decontamination.

For example, Noland, U.S. Pat. No. 4,738,206 relates to an apparatus and method for the low temperature thermal stripping of volatile organic contaminants from soil. The method involves the sealing of contaminated soil within a conveyor system and vapor stripping the contaminants. This is apparently accomplished by heating the contaminated soil, which is retained under a negative pressure, by use of a hollow screw conveyor through which hot oil is passed and sweeping the combustion gases from the oil heater over the soil as it is transported by the conveyor, so that a temperature gradient is formed between the devices inlet and outlet.

However, several problems exist with this technology. First, considering the negative pressure and the relative orientations of the combustion gas inlet and the contaminant-containing gas outlet, it is unlikely that the desirable temperature gradient can be formed throughout the entirety of the sample being treated. Furthermore, the use of hollow screw conveyors is problematic. Hollow screw flights are costly to fabricate. There is always a danger that the hot oil will leak out of the system at any of the complex joints at the ends of the conveyor. This leaking fluid may reduce the efficiency of heat transfer, threaten the mechanical integrity of the device and create a new source of potentially toxic environmental pollution. In addition, because of the thermal properties of available heating fluids, the range of temperatures achievable through the system is dramatically reduced. Furthermore, the pressure drop created by pumping the heat transfer medium through the screw limits the flow required for effective heat transfer to the soil. Accordingly, the applicability of this technology is limited to relatively low boiling point VOC.

Welsh, U.S. Pat. No. 4,702,178 relates to an emergency exhaust system for a hazardous waste incinerator. While the majority of this patent discusses the eventuality of a malfunction in one of a plurality of incineration systems, the patent does disclose the use of a belt-type conveyor such as the type disclosed in U.S. Pat. Nos. 3,648,630 and 4,202,282, for conveying contaminated material under a series of rakes and infrared heating elements, wherein solid waste material is oxidized into gaseous combustion products which are collected through a secondary system.

Belt conveyors, however, are large and often inefficient. These conveyors also tend to suffer from the loss of conveyed material which may fall off of the belt conveyor prior to complete treatment. The collection and clearance of this inadvertently discharged material could require the shutdown of the apparatus with resulting loss in time and efficiency. Further, this type of conveyor system may not provide sufficient agitation of the contaminated material to allow for efficient and effective removal of substantially all of the volatile contaminants contained therein. Finally, conveyor belts may be subject to degradation when constantly exposed to the elevated temperature and contaminated atmosphere within the apparatus, and are subject to frequent breakage. The disposal of these conveyor belts may also present its own unique problem.

DesOrmeaux et al., U.S. Pat. No. 4,606,283 relates to a system for extracting contaminants and hydrocarbons from cuttings waste in oil well drilling. This is accomplished by the use of an auger disposed substantially throughout the length of the chamber which is jacketed by a series of electrical heating rods which are used to volatilize drilling oil contained on the cuttings. However, the use of an electrical heating rod external to a metal jacket which surrounds the oil drilling cuttings and the auger is inefficient and wastes considerable power making its operation costly. Second, the patent relates to a very specific method and apparatus designed wholly for the removal of specific organic materials contained in liquid form, namely, cutting oils. The nature and composition of these oils are known to those of ordinary skill in the art and, therefore, disposal methods and apparatus may be easily tailored to the specific requirements thereof. However, these methods and apparatus may be of little or no use in treating soil containing a broad spectrum of VOC.

Hobbs et al., U.S. Pat. No. 3,648,630 discloses an incinerator for burning sludge from waste-water treating plants in which the sludge is initially pre-treated by being heated in an infrared radiated screw conveyor to vaporize a substantial portion of the moisture in the sludge, thereby breaking down the sludge into particle sizes suitable for incineration. According to the specification, at column 6, lines 56–61, the fundamental purpose of the infrared heating in the screw conveyor is not to remove moisture but rather to fragment the sludge, which is tightly bonded together by the interlacing of hair and other filmous particles. There is no disclosure that an infrared heated screw conveyor can be used to heat soil to remove higher and lower volatility organic contaminants without combining the conveyor with other methods of soil decontamination such as soil incineration.

Other methods and patents of interest include: U.S. Pat. Nos. 4,009,667; 4,140,478; 4,231,304; 4,338,869; 4,667,609; and 4,802,424.

SUMMARY AND OBJECTS OF THE INVENTION

From the previous discussion, it should be readily apparent that the current technology is inadequate for efficiently and cost-effectively removing higher and lower volatility organic contaminants from soil or other materials.

It is therefore an object of the present invention to provide a cost-effective method and apparatus for the removal of higher and lower volatility organic materials from contaminated media such as soil.

It is also an object of the present invention to provide for the removal of higher and lower volatility organic contaminants from soil and other media with apparatus of relative simple mechanical construction, having a much higher throughput in a much smaller configuration relative to other systems, thereby providing a more reliable operation, efficiency and cost-effectiveness.

Thus, in accordance with the present invention, an apparatus is provided for the removal of higher and lower volatility organic materials from media contaminated therewith, including an externally heated solid screw conveyor having a media inlet, a media outlet and one or more solid core flights; means for collecting and delivering media contaminated with higher and lower volatility organic contaminants to the screw conveyor inlet; at least one infrared radiation source external to the screw conveyor adapted to heat the media in the screw conveyor to a temperature above which at least one of the contaminants volatilize; and means for venting volatilized contaminants from the screw conveyor.

In accordance with another aspect of the present invention, the solid screw conveyor includes a first heating zone and a second heating zone with the one or more solid core flights arranged to transmit the contaminated media from the first zone to the second zone. The plurality of infrared radiation sources include a first infrared radiation source adapted to heat the media in the first zone of the screw conveyor to a first temperature and a second infrared radiation source adapted to heat the media in the second zone of the screw conveyor to a second temperature, which second temperature may be greater than, less than or the same as the first temperature, and the means for venting volatilized contaminants include a first means for venting volatilized contaminants from the first zone and a second means for volatilizing contaminants from the second zone of the solid screw conveyor.

In accordance with yet another aspect of the present invention, the solid screw conveyor may further include a third heating zone with the one or more solid core flights arranged to transmit the contaminated media from the second zone to the third zone. The plurality of infrared radiation sources may further include a third infrared radiation source adapted to heat the media in the third zone of the screw conveyor to a third temperature, which third temperature may be greater than, less than or the same as the first and second temperatures, and the means for venting the volatilized contaminants may further include a third means for venting volatilized contaminants from the third zone of the solid screw conveyor.

In accordance with still yet another aspect of the present invention, a first solid screw conveyor is provided having a first media inlet, a first media outlet and one or more solid core screw flights; a first infrared radiation source external to the first screw conveyor adapted to heat the media in the first screw conveyor to a first temperature above which at least one of the media contaminants volatilize; and a first means for venting volatilized media contaminants from the first screw conveyor. A second solid screw conveyor is also provided having a second media inlet, a second media outlet and one or more solid core screw flights; a second infrared radiation source external to the second screw conveyor adapted to heat the media in the second screw conveyor to a second temperature; and a second means for venting volatilized media contaminants from the second screw conveyor. Means are provided for connecting the second media inlet of the second solid screw conveyor to the first media outlet of the first solid screw conveyor. The second temperature may be greater than, less than or the same as the first temperature.

In accordance with another aspect of the present invention, the two conveyor apparatus is provided with a third solid screw conveyor having a third media inlet, a third media outlet and one or more solid core screw flights, and means for connecting the third media outlet to the second media inlet of the second solid screw conveyor. A third infrared radiation source external to the third solid screw conveyor is provided to heat the media in the third solid screw conveyor to a third temperature, which third temperature may be greater than, less than or the same as either or both of the first and second temperatures. A third means for venting the volatilized contaminants from the third screw conveyor is also provided.

In accordance with another aspect of the present invention, a method is provided for the continuous removal of higher and lower volatility organic materials from contaminated media such as soil, including the steps of providing a source of contaminated media; agitating, manipulating and transporting the media by use of at least one screw conveyor having one or more solid core flights; heating simultaneously the media with a quantity of infrared radiation sufficient to volatilize at least one of the organic contaminants in the media as the contaminated media is agitated, manipulated and transported by the at least one solid core screw conveyor so that at least one organic contaminant is volatilized and the media is decontaminated; collecting the volatilized organic contaminants; and discharging the decontaminated media.

In accordance with another aspect of the method of the present invention, the solid screw conveyor includes a first zone and a second zone, the transporting step includes the step of transporting the media from the first zone to the second zone and the heating step includes the step of heating the media in the first zone with a first quantity of infrared radiation sufficient to heat the first zone media to a first temperature and the step of heating the media in the second zone with a second quantity of infrared radiation sufficient to heat the second zone media to a second temperature, which temperature may be greater than, less than or the same as the first temperature.

In accordance with yet another aspect of the method of the present invention, the screw conveyor further includes a third zone, the transporting step includes the step of transporting the media from the second zone to the third zone and the heating step includes the step of heating the media in the third zone with a third quantity of infrared radiation sufficient to heat the third zone soil to a third temperature, which third temperature may be greater than, less than or the same as the first and second temperatures.

In accordance with still yet another aspect of the method of the present invention, the screw conveyor is a first screw conveyor, a second screw conveyor having one or more solid core flights is provided, which second screw conveyor is in communication with the first screw conveyor, and prior to discharging the decontaminated soil, the process further includes the steps of transporting the media to the second screw conveyor from the first screw conveyor; agitating, manipulating and transporting the soil with the second screw conveyor; and heating simultaneously the soil with a second quantity of infrared radiation sufficient to heat the second screw conveyor soil to a second temperature greater than, less than or the same as the first temperature.

In accordance with another aspect of the process of the invention, a third screw conveyor is provided having one or more solid core flights; and the process further includes the step of providing contaminated media to the third screw conveyor, agitating, manipulating, and transporting the media with the third screw conveyor, heating simultaneously the media with a third quantity of infrared radiation sufficient to heat the media to a third temperature, which third temperature is greater than, less than or the same as the first and second temperatures; and transporting the media to the second screw conveyor.

With these and other objects and advantages, the invention will be better understood by reference to the description which follows with reference to the accompanying drawings.

DETAILED DESCRIPTION OF THE PREFERRED EMBODIMENT

The present invention provides numerous advantages over prior art methods and apparatus. For example, because the method and apparatus of the present invention have a broad applicability to both high and low boiling points, high and low molecular weight organic contaminants, a wide variety of contaminated soils and other media may be treated without recourse to other methods and apparatus of treatment. This saves the cost of obtaining and operating multiple apparatus of more specific applicability and training operators on a plurality of different treating equipment. Furthermore, in view of both the relatively high throughput of the apparatus of the present invention and its relative simplicity, higher levels of efficiency may be achieved than could have previously been realized. This increase in efficiency also reflects a decrease in the cost of overall cleanup at a contaminated site.

Figure 1:
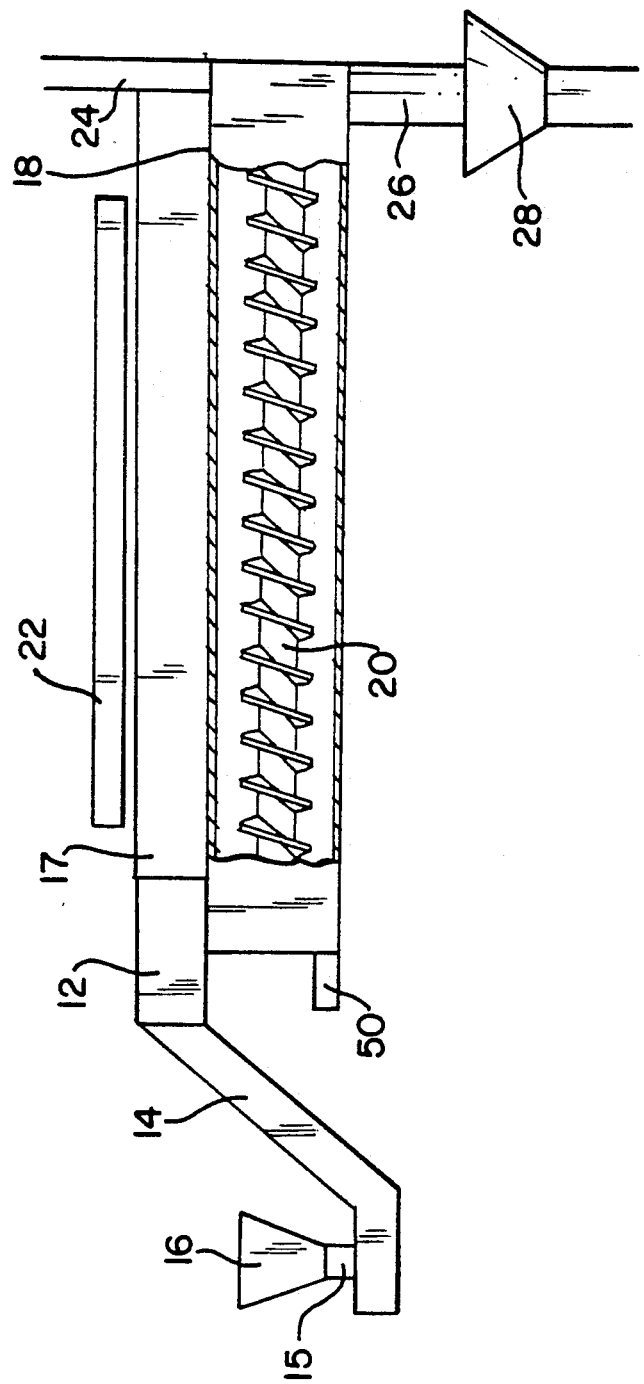
FIG. 1 is a schematic elevational view of one preferred form of apparatus in accordance with the present invention with portions removed for clarity of illustration.
Figure 5:
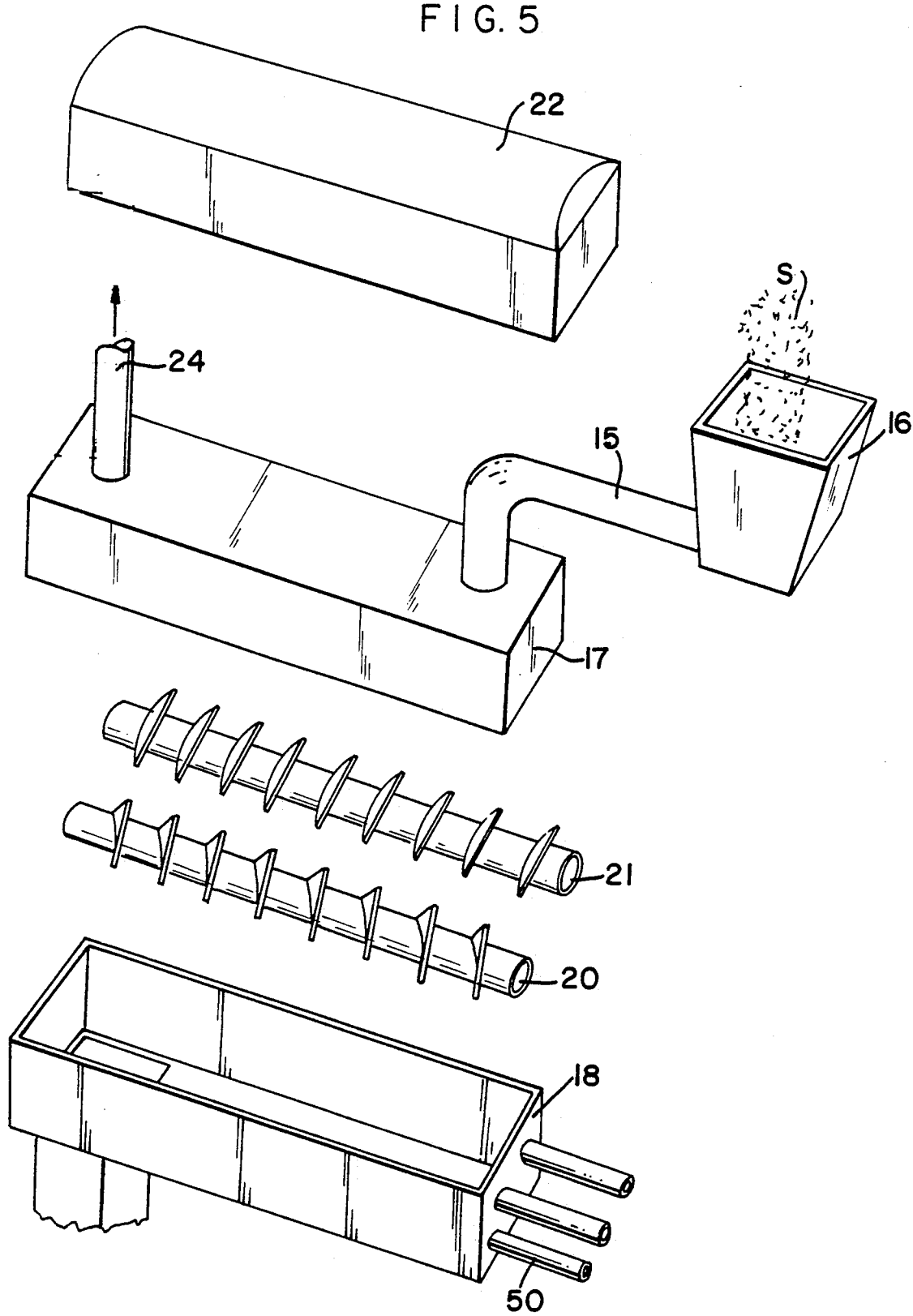
FIG. 5 is an elevated perspective view of the preferred form of apparatus depicted in FIG. 1.

Turning now to the drawings in general and FIGS. 1 and 5 in particular, the numeral 16 designates a feed hopper for the contaminated media, which may be soil (s) removed from the earth by conventional earth moving means and stored in the hopper hereshown having a bottom discharge pipe 15. In FIG. 1, reference numeral 14 designates an inclined conveyor, which may be a screw conveyor or a continuous belt conveyor, for example, having a sealed connection to screw conveyor 18. In FIG. 5, the discharge pipe 15 discharges directly into the inlet of screw conveyor 18 by a sealed connection with lid 17 of screw conveyor 18.

In FIG. 1, the inclined conveyor 14, at its upper end, discharges in sealed relationship into a feed device 12. Any device capable of discharging in sealed relationship to a screw conveyor is suitable for use in the present invention as feed device 12. The screw conveyor 18 is essentially conventional and may be any externally heated screw conveyor device capable of agitating, manipulating and transporting media such as soil. The externally heated screw conveyor may have one or more solid core screws capable of rotatably intermeshing. The number of screws is not critical and will be selected based upon the throughput desired. Externally heated screw conveyors having up to four solid core screws are not uncommon and are suitable for use in the present invention. The depicted screw conveyor 18 is an externally heated device having twin intermeshing screws. From the perspective of FIG. 1, one screw flight 20 is visible. FIG. 5 depicts screw flights 20 and 21.

An infrared radiation source 22, external to the screw conveyor, is adapted to heat the soil in the conveyor to a temperature above the temperature at which the media contaminants volatilize. One or more infrared radiation sources may be used and the single source or combination of sources should be capable of heating the media in the screw conveyor to a temperature above the vaporization temperature of the media contaminants. Of course, the temperature to which the media is heated depends upon its residence time in the screw conveyor, which in turn will depend upon the screw conveyor throughput. Preferred infrared radiation sources are capable of heating the media in the screw conveyor to temperatures above 800° C. However, this should not be construed as meaning that the upper boundary of this temperature range is preferred. Instead, the advantage of the current invention resides in the ability to select a desired temperature within this range depending upon the vapor characteristics of a particular contaminant being processed. The screw conveyor may optionally include a means for the transmission of infrared radiation from the infrared radiation source such as, for example, a quartz window.

Means 24 for venting the volatilized contaminants from the screw conveyor are provided. FIG. 1 depicts outlet 26, provided for the discharge of decontaminated media from the screw conveyor, shown here discharging soil into hopper 28, for return to the earth.

Means 50 may be connected to the screw conveyor for controllably delivering a gas uniformly therethrough. This means may be so connected to the conveyor so that the controlled gas flows through the conveyor in substantially the same direction as the movement of the media through the conveyor, or the means may be so connected to the conveyor so that the controlled gas flows in a direction substantially opposite from the direction of the movement of the media through the conveyor. The gas may be an oxidizing gas, reducing gas or an inert gas. Once delivered, the gas may exit the screw conveyor by way of the venting means together with the volatilized organic contaminants.

Figure 2:
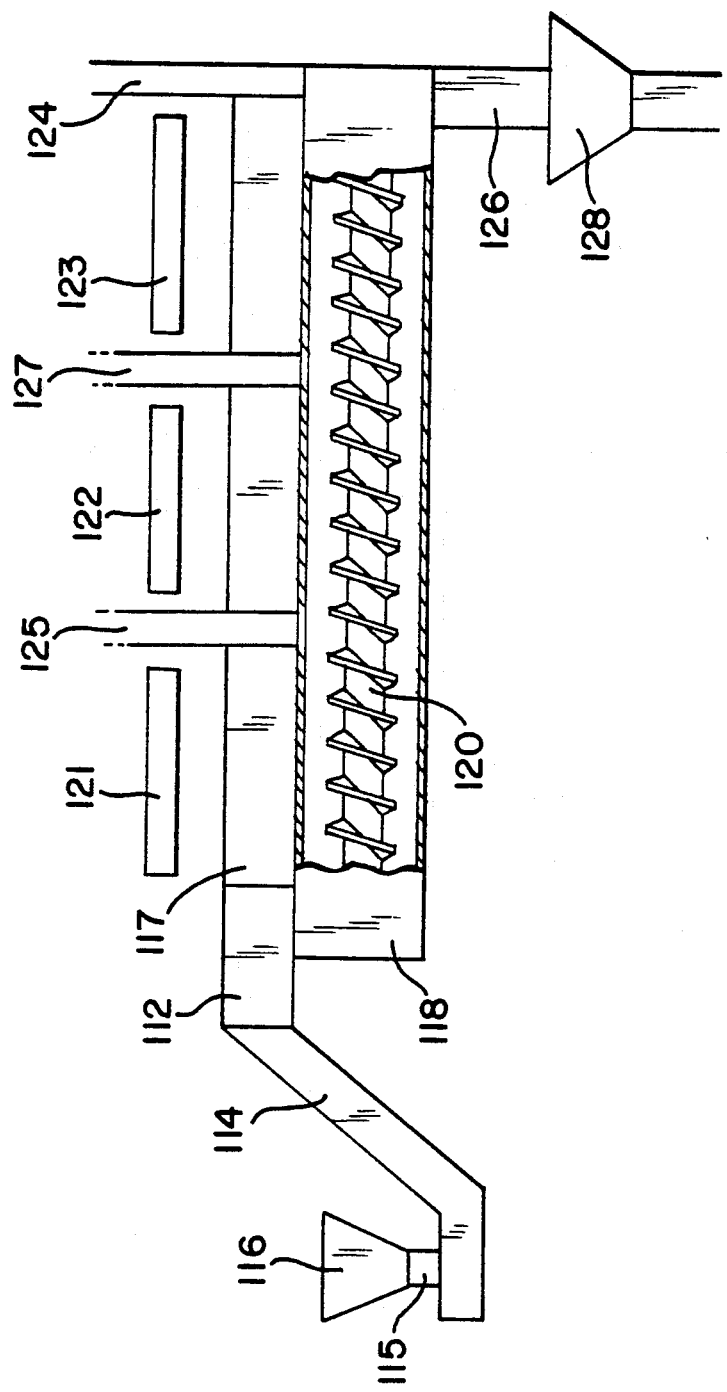
FIG. 2 is a schematic elevational view of another preferred form of apparatus in accordance with another embodiment of the present invention with portions removed for clarity of illustration.

FIG. 2 depicts a screw conveyor having more than one source of infrared radiation adapted externally thereto and connected substantially along the entirety of at least one longitudinal surface of the conveyor. Screw conveyor 118 having solid core screw flight 120 is delivered contaminated media by feed device 112 from inclined conveyor 114 which is in turn fed by hopper 116 through bottom discharge pipe 115. Three infrared radiation sources 121, 122, and 123 are arranged externally to the conveyor lid 117 to heat the media in the screw conveyor to a temperature above a temperature at which at least one of the contaminants volatilize. Source 121 is arranged to initially heat the contaminated media delivered by the feed device 112 to a first temperature, source 122 is arranged to next heat the media to a second temperature, and source 123 is arranged to next heat the media to a third temperature prior to the discharge of the media through outlet 126. The region of the screw conveyor where the media is heated to the first temperature is defined as the first heating zone of the conveyor, the region of the screw conveyor where the media is heated to the second temperature is defined as the second heating zone of the conveyor and the region of the screw conveyor where the media is heated to the third temperature is defined as the third heating zone of the conveyor. The solid core screw flights of the conveyor function to both agitate and expose new surface areas to the heating source as well as advance the soil from zone to zone.

The first temperature may be independently greater than, less than or the same as the second and third temperatures; and the second temperature may be independently greater than, less than or the same as the first and third temperatures. However, such an arrangement makes possible the arrangement of a temperature gradient increasing from the first heating zone to the second heating zone to the third heating zone.

Preferably, the first temperature is a temperature above which any water in the media will volatilize. The first temperature should be greater than about 90° C. A first zone temperature of between 90° C. and about 140° C. is preferred, and even more preferred are first zone temperatures between about 95° C. and about 125° C. Because of the great quantity of moisture generally found in media such as soil, the initial heating of the media in the first heating zone will consume the most heat energy. However, by initially driving off the moisture, further heating of the media in the second and third heating zones to drive off lower volatility contaminants can be performed more efficiently. The heating of the media in the first heating zone will also volatilize higher volatility organic contaminants more volatile than water.

It is thus preferred that the second temperature be a temperature above which higher volatility organic contaminants less volatile than water are vaporized. Preferred conditions are difficult to generalize in that each contaminant will have a different processing temperature for volatilization. However, given temperatures for individual contaminants are readily determinable by one of ordinary skill in the art by known means. With this in mind, generally a temperature above 125° C. is acceptable. Second temperatures between about 125° C. and about 800° C. are preferred, while even more preferred are second temperatures between about 150° C. and about 250° C. The third temperature should then be a temperature above which lower volatility organic contaminants vaporize, generally a temperature above 150° C. Third temperatures between about 150° C. and about 800° C. are preferred, while even more preferred are third temperatures between about 175° C. and about 350° C.

As shown in FIG. 2, separate venting means 124, 125 and 127 are provided with infrared radiation sources 121, 122 and 123, respectively, to vent the material that volatilizes in each zone of the screw conveyor heated by the individual infrared radiation sources. The decontaminated media then exits the screw conveyor by outlet 126 to hopper 128.

Alternatively, two infrared radiation sources may be adapted externally to the screw conveyor to heat the media in the conveyor to a temperature above a temperature at which at least one of the contaminants volatilize. In such an embodiment, the first infrared radiation source is arranged to initially heat the contaminated media delivered by the feed device to a first temperature and the second infrared radiation source is arranged to next heat the media to a second temperature which may be greater than, less than or the same as the first temperature. The region of the screw conveyor where the media is heated to the first temperature is again defined as the first heating zone of the conveyor, and the region of the screw conveyor where the media is heated to the second temperature is again defined as the second heating zone of the conveyor. In such an embodiment, the first temperature is preferably a temperature less than the second temperature and above which the higher volatility contaminants will vaporize; and the second temperature is preferably a temperature above which the lower volatility contaminants will vaporize.

Figure 3:
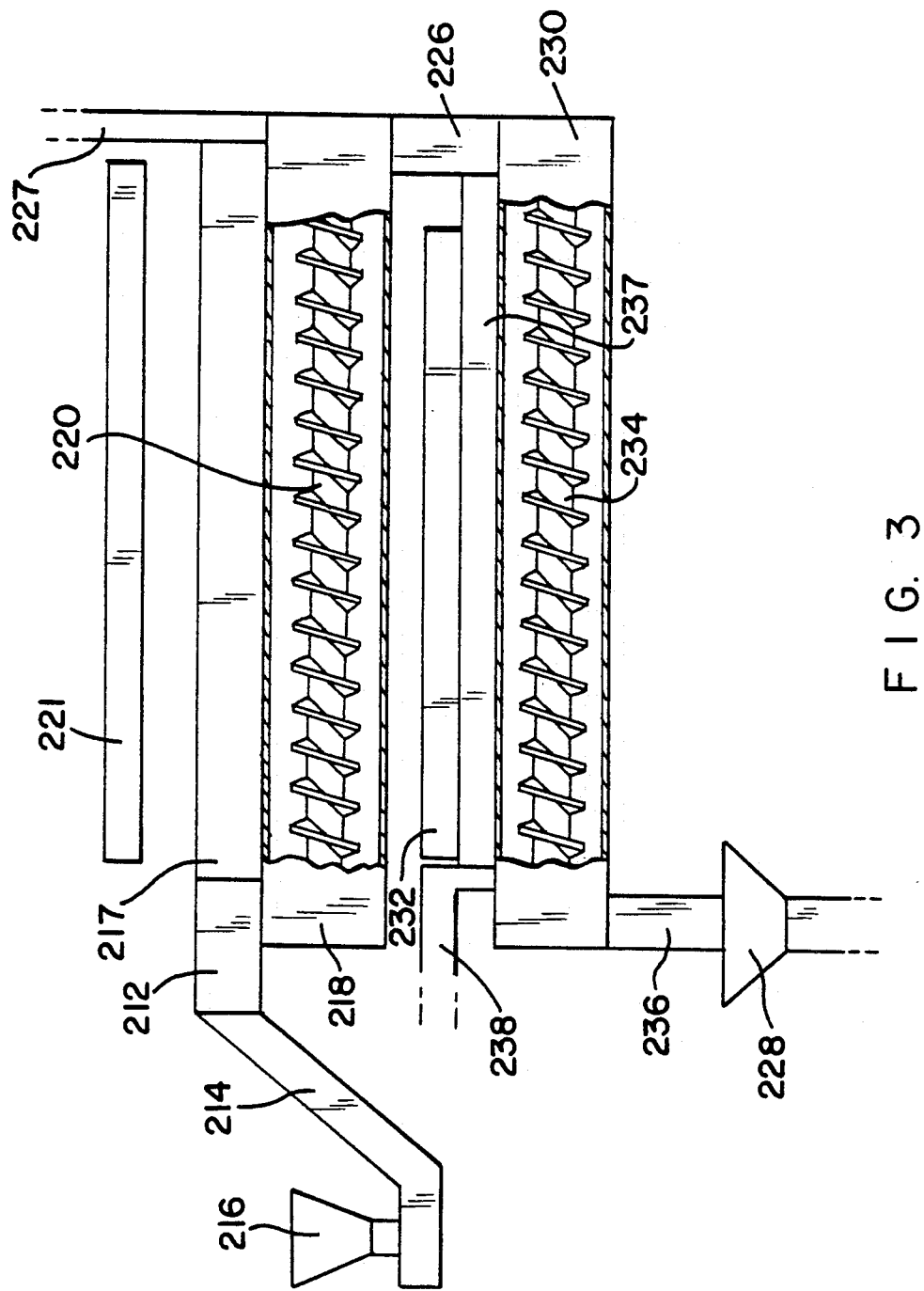
FIG. 3 is a schematic elevational view of another preferred form of apparatus in accordance with yet another embodiment of the present invention with portions removed for clarity of illustration.

More than one screw conveyor can be joined to increase the throughput of the apparatus. FIG. 3 depicts a screw conveyor 218 having a solid core screw flight 220 to which contaminated media is delivered by feed device 212 from inclined conveyor 214 fed by hopper 216 through bottom discharge pipe 215. The outlet of screw conveyor 218 is connected to the inlet of conveyor 230 by pipe 226. Conveyor 230 also has a solid core screw flight 234. Infrared radiation source 221 is arranged externally to lid 217 of conveyor 218 and infrared radiation source 232 is arranged externally to lid 237 of conveyor 230. The infrared radiation sources are adapted to heat the media in the conveyors to a temperature above which the contaminants will volatilize. As with the screw conveyors described above, the infrared radiation source of conveyor 218 is arranged so that the media is heated to a first temperature. Infrared radiation source 232 is then arranged externally to screw conveyor 230 to next heat the media to a second temperature greater than, less than or the same as the first temperature, after which the media is discharged through outlet pipe 236 to hopper 228 for return to the earth. A screw conveyor having plural sources of infrared radiation adapted external thereto may also be used in combination with another screw conveyor.

As shown in FIG. 3, separate venting means 229 and 238 are provided with each infrared radiation source to vent the material that volatilizes in each screw conveyor heated by the individual infrared radiation sources.

In the embodiment depicted in FIG. 3, high efficiencies are obtained from the second screw conveyor. Because the moisture and higher volatility contaminants have been removed from the media prior to its delivery to the second screw conveyor, little heat is required to maintain the conveyor at the elevated temperature necessary for the removal of lower volatility contaminants. The throughput of this second screw conveyor is so great because of this that it is possible to feed this conveyor with media from two screw conveyors operating at lower temperatures and slower speeds to remove moisture and higher volatility organic contaminants Such an apparatus is depicted in FIG. 4.

As in FIG. 3, a screw conveyor 318 having solid core screw flight 320 is delivered contaminated media such as soil by feed device 312 from inclined conveyor 314 fed by hopper 316 through bottom discharge pipe 315. Conveyor 340 having solid core screw flight 342 is similarly fed, but the feed device, inclined conveyor and hopper are not shown. Pipe 326 connects the outlet of conveyor 318 to the inlet of conveyor 330. Likewise, the outlet of conveyor 340 is connected to the inlet of conveyor 330 by pipe 348. Conveyor 330 also has a solid core screw flight 334. Both conveyor 318 and conveyor 340 are heated by infrared radiation sources 321 and 344, adapted to heat the media in each conveyor to a temperature above which at least one of the contaminants will volatilize.

Figure 4:
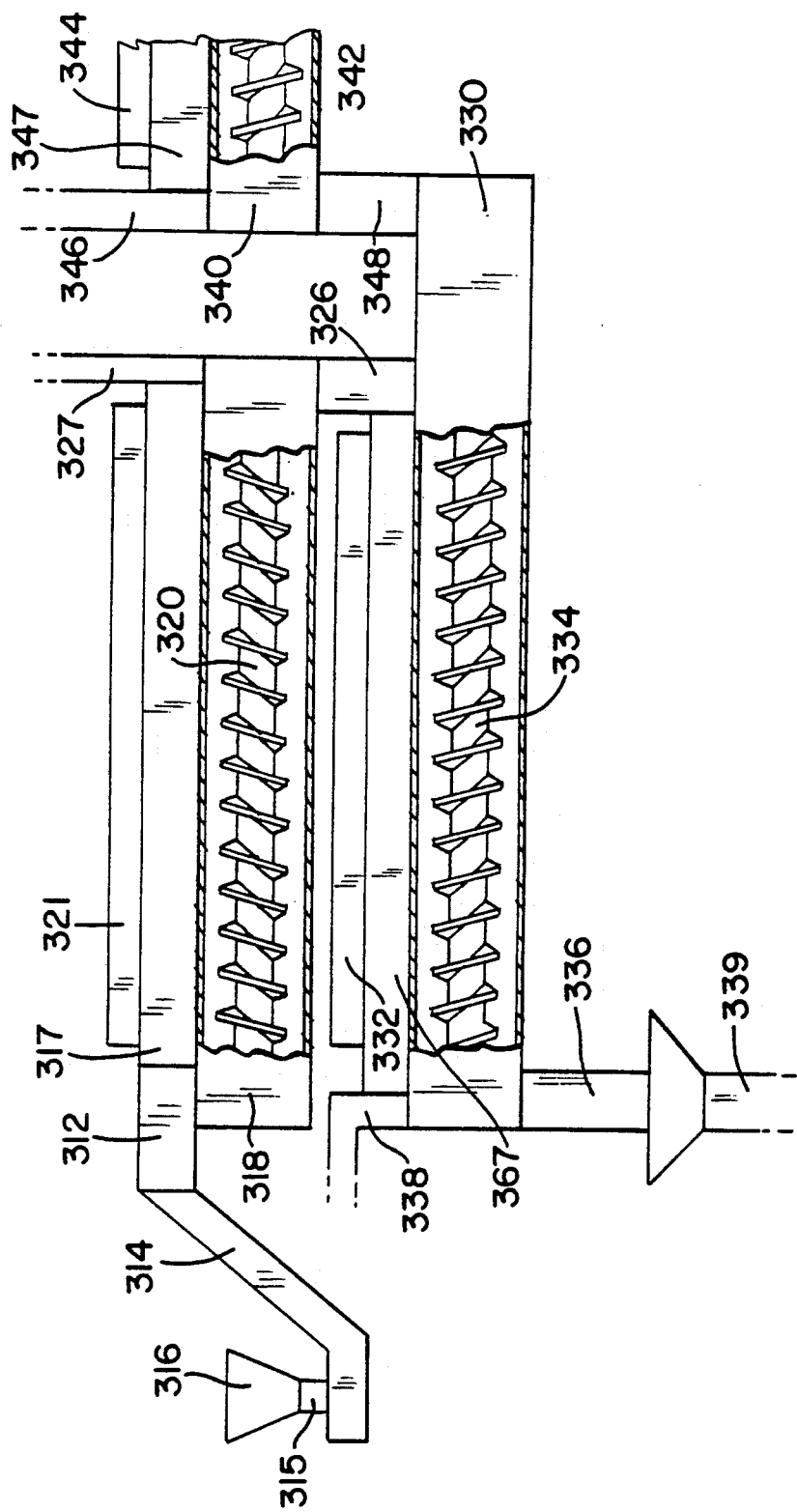
FIG. 4 is a schematic elevation view of another preferred form of apparatus in accordance with still another embodiment of the present invention with portions removed for clarity of illustration.

As with the apparatus depicted in FIG. 3, the apparatus of FIG. 4 has infrared radiation sources arranged so that for conveyor 318, infrared radiation source 321 above conveyor lid 317 initially heats the media to a first temperature, and then discharges it by way of pipe 326 into the inlet of conveyor 330. Infrared radiation source 332 arranged externally to lid 367 of screw conveyor 330 then heats the media to a second temperature greater than, less than or the same as the first temperature, after which the media is discharged through outlet pipe 336 to hopper 339 and then returned to the earth. Infrared radiation source 344 above lid 347 of conveyor 340 functions similarly to heat the media agitated and manipulated therein to a third temperature and then discharges it by way of pipe 348 into the inlet of conveyor 330, where it is similarly agitated, manipulated and heated. The third temperature may be greater than, less than or the same as either or both of the first and second temperatures.

As with the apparatus of FIG. 3, the first and third temperatures to which the media is heated are preferably temperatures above which higher volatility contaminants will vaporize. The second temperature is preferably greater than both the first and third temperatures and, even more preferably, a temperature above which lower volatility organic contaminants will vaporize. As in the apparatus of FIG. 3, separate venting means are provided with each infrared radiation source to vent the material that volatilizes in each screw conveyor. Referring to FIG. 4 for screw conveyor 318, venting means 327 is associated with infrared radiation source 321. For screw conveyor 340, venting means 346 is associated with infrared radiation source 344. For screw conveyor 330, venting means 338 is provided.

In any of the apparatus depicted in FIGS. 1-4, the venting means may communicate with a single secondary treatment means (not shown) for processing the organic contaminants and other materials volatilized. Alternatively, each venting means may communicate with separate secondary treatment means (not shown) that may be the same or different.

In each of the depicted embodiments, the secondary treatment means may consist of a combustion chamber, a combustion chamber in combination with a downstream wet scrubber for removal of acid gases, a catalytic converter, means for removing dust, means for adsorbing some of the organic contaminants on activated carbon, and means for recovering at least one of the organic contaminants by condensation optionally followed by adsorption on activated carbon.

Referring to FIG. 1, it will now be appreciated that in operation, contaminated media such as soil is delivered to screw conveyor 18 having solid core screw flight 20 by feed device 12, which receives the media from incline conveyor 14 fed by hopper 16 through bottom discharge pipe 15 The media is processed in intimate contact with the intermeshing solid core screw flights which media is externally heated by infrared radiation source 22. Decontaminated media exits the screw conveyor by way of outlet 26 into hopper 28 for return to the earth. The heating volatilizes at least one of the organic contaminants that are collected by venting means 24 for processing by secondary treatment means (not shown) in communication with the venting means.

When more than one source of infrared radiation is adapted externally to the screw conveyor, as in FIG. 2, conveyor 118 is externally heated by infrared radiation sources 121, 122, and 123, and the screw conveyor includes a first heating zone heated by infrared radiation source 121 to a first temperature, a second heating zone heated by infrared radiation source 122 to a second temperature and a third heating zone heated by infrared radiation source 123 to a third temperature. In this example, the third temperature is greater than the second temperature, which is greater than the first temperature. As stated above, the first temperature is preferably a temperature above which water in the media will volatilize, the second temperature is preferably a temperature above which organic contaminants less volatile than water will volatilize and the third temperature is preferably a temperature above which the lower volatility organic contaminants will volatilize Venting means 125 collects the organic contaminants volatilized by infrared radiation source 121, venting means 127 collects the organic contaminants volatilized by infrared radiation source 122, and venting means 124 collects the organic contaminants volatilized by infrared radiation source 123.

For methods using screw conveyors with two infrared radiation sources adapted externally thereto, the first infrared radiation source will heat a first zone of the conveyor to a first temperature, a second infrared heating source will heat a second zone of the conveyor to a second temperature and the solid core screw flights will transport the media from the first zone to the second zone prior to discharge from the outlet. The first temperature is preferably a temperature above which the higher volatility organic contaminants will volatilize and the second temperature is preferably a temperature above which the lower volatility organic contaminants will volatilize.

When two screw conveyors are used in combination, as in FIG. 3, the media is heated to a first temperature in conveyor 218 by infrared radiation source 221. This media is then transported to screw conveyor 330 by pipe 226 which connects the outlet of screw conveyor 218 to the inlet of screw conveyor 230. The media is then heated to a second temperature by infrared radiation source 232 prior to discharge by outlet 236 to hopper 228 As before, the first temperature is preferably a temperature above which higher volatility organic contaminants in the media will vaporize, and the second temperature is preferably a temperature above which lower volatility organic contaminants will vaporize Venting means 227 collects the organic contaminants volatilized by infrared radiation source 221, and venting means 238 collects the organic contaminants volatilized by infrared radiation source 232.

When two screw conveyors are used in combination to feed a third screw conveyor, as in FIG. 4, media such as soil in screw conveyor 318 is heated to a first temperature by infrared radiation source 321. Soil outlet 326 transports the media from screw conveyor 318 fo the inlet of screw conveyor 330, where it is heated to a second temperature by infrared radiation source 332 Solid core screw flight 334 advances the media to outlet 336 where it is collected in hopper 339. Similarly, for screw conveyor 340, the media is heated to a third temperature by infrared radiation source 344, prior to discharge through inlet 348 to the inlet of screw conveyor 330, where it is also heated to the second temperature. The second temperature may be greater than, less than or the same as either or both of the first and third temperatures. The first and third temperatures are preferably temperatures above which higher volatility organic contaminants in the media will volatilize. The second temperature is preferably greater than both the first and third temperatures and even more preferably a temperature above which any lower volatility organic contaminants will volatilize. For screw conveyor 318, venting means 327 collects the organic contaminants volatilized by infrared radiation source 321. For screw conveyor 340, venting means 346 collects the organic contaminants volatilized by infrared radiation source 344. For screw conveyor 330, venting means 338 collects the organic contaminants volatilized by infrared radiation source 332.

In each of the above described processes, the collected volatilized organic contaminants are processed by one or more secondary treatment means in communication with the venting means. The collected organic contaminants may be separately processed by individual secondary treatment means in communication with a venting means. In the process of the apparatus of FIG. 4, the volatilized organic contaminants collected by venting means 327 of screw conveyor 318 and venting means 346 of screw conveyor 340 and processed by a first secondary treatment means and volatilized organic contaminants collected by venting means 338 of screw conveyor 330 can be processed by a second secondary treatment means.

The secondary treatment means by which the volatilized organic contaminants can be processed include burning in a combustion chamber optionally followed by wet scrubbing to remove acid gases, treating with a catalytic converter, adsorbing on activated carbon, removing dust, and condensing optionally followed by adsorbing on activated carbon.

It will accordingly be appreciated that, in accordance with this invention, higher and lower volatility organic contaminants are removed from media such as soil by agitating, manipulating and transporting such media by use of at least one screw conveyor having one or more solid core screws, heating simultaneously the media with a quantity of infrared radiation sufficient to volatilize at least one of the organic contaminants as the contaminated media is agitated, manipulated and transported by the at least one solid core screw conveyor so that the organic contaminants are volatilized and the media is decontaminated, collecting the volatilized organic contaminants, and discharging the decontaminated media for return to the earth. By operating within the above-described parameters, a continuous process is provided for the substantial decontamination of soil and other media contaminated with higher and lower volatility organic contaminants at a cost efficient rate. As will be readily appreciated, numerous variations and combinations of the feature set forth above can be utilized without departing from the present invention as set forth in the claims. Such variations are not regarded as a departure from the spirit and scope of the invention, and all such modifications are intended to be included within the scope of the following claims.

We claim:

1. An apparatus for the removal of higher and lower volatility organic contaminants from media contaminated therewith comprising:
    a screw conveyor having an inlet, an outlet and one or more solid core flights;
    means for connecting and delivering media contaminated with higher and lower volatility organic contaminants to said screw conveyor inlet;
    at least one infrared radiation source external to said screw conveyor adapted to heat said media in said screw conveyor to a temperature above which at least one of said contaminants volatilize;
    venting means for venting said volatilized contaminants from said screw conveyor; and
    gas delivery means connected to said screw conveyor for delivering a gas therethrough, so that said gas flows through said conveyor in a direction substantially opposite from the direction of movement of said media through said conveyor, whereby said delivered gas exits said screw conveyor by said venting means.

2. The apparatus of claim 1, wherein said gas delivery means controllably delivers said gas uniformly through said screw conveyor.

3. The apparatus of claim 1, further comprising secondary treatment means in communication with said venting means for processing said volatilized contaminants.

4. The apparatus of claim 1, wherein said gas is selected from the group consisting of oxidizing gases, reducing gases and inert gases.

5. The apparatus of claim 1, wherein said at least one infrared radiation source comprises a plurality of infrared radiation sources connected substantially along the entirety of at least one longitudinal surface of said screw conveyor.

6. The apparatus of claim 5, wherein said screw conveyor comprises a first heating zone and a second heating zone with said one or more solid core flights arranged to transport said contaminated media from said first zone to said second zone, said plurality of infrared radiation sources comprise a first infrared radiation source adapted to heat said media in said first zone of said screw conveyor to a first temperature and a second infrared radiation source adapted to heat said media in said second zone of said screw conveyor to a second temperature, and said venting means comprises first venting means for venting volatilized contaminants from said first zone of said screw conveyor and second venting means for venting volatilized contaminants from said second zone of said screw conveyor.

7. The apparatus of claim 6, wherein said second temperature is greater than said first temperature.

8. The apparatus of claim 7, wherein said first temperature is above the temperature at which said higher volatility organic contaminants volatilize and said second temperature is above the temperature at which said lower volatility organic contaminants volatilize.

9. The apparatus of claim 6, further comprising first secondary treatment means in communication with said first venting means and second secondary treatment means in communication with said second venting means.

10. The apparatus of claim 5, wherein said screw conveyor further comprises a third zone with said one or more solid core flights arranged to transmit said contaminated media from said second zone to said third zone, said plurality of infrared radiation sources further comprise a third infrared radiation source adapted to heat said media in said third zone of said screw conveyor to a third temperature, and said means for venting said volatilized contaminants further comprises a third means for venting volatilized contaminants from said third zone of said screw conveyor.

11. The apparatus of claim 10, wherein said third temperature is greater than said second temperature and said second temperature is greater than said first temperature.

12. The apparatus of claim 11, wherein said media contains water and said first temperature is above the temperature at which said water in said media volatilizes, said second temperature is above the temperature at which said higher volatility contaminants in said media that are less volatile than water volatilize, and said third temperature is above the temperature at which said lower volatility contaminants in said media volatilize.

13. The apparatus of claim 6, further comprising first, second and third secondary treatment means in communication with said first, second and third venting means, respectively.

14. The apparatus of claim 1, wherein said screw conveyor is a first screw conveyor with a first inlet and a first outlet, said infrared radiation source is a first infrared radiation source adapted to heat said media to a first temperature and said venting means is a first venting means, and said apparatus further comprises:
a second screw conveyor comprising a second inlet, a second outlet, and one or more solid core flights;
means for connecting said first outlet to said second inlet;
a second infrared radiation source, external to said second screw conveyor, adapted to heat said media in said second screw conveyor to a second temperature; and
second venting means for venting volatilized contaminants from said second screw conveyor.

15. The apparatus of claim 14, wherein said second temperature is greater than said first temperature.

16. The apparatus of claim 15, wherein said first temperature is above the temperature at which said higher volatility contaminants in said media volatilizes, and said second temperature is above the temperature at which said lower volatility contaminants volatilize.

17. The apparatus of claim 14, further comprising first and second secondary treatment means in communication with said first and second venting means, respectively.

18. The apparatus of claim 14, further comprising:
a third screw conveyor having a third inlet, a third outlet and one or more solid core flights;
means for connecting said third outlet to said second inlet;
a third infrared radiation source external to said third screw conveyor adapted to heat said media in said third screw conveyor to a third temperature; and
third venting means for venting said volatilized contaminants from said third screw conveyor.

19. The apparatus of claim 18, wherein said second temperature is greater than said third temperature.

20. The apparatus of claim 19, wherein said third temperature is above the temperature at which said higher volatility contaminants in said media volatilize, and said second temperature is above the temperature at which said lower volatility contaminants volatilize.

21. The apparatus of claim 18 further comprising first, second and third secondary treatment means in communication with said first, second and third venting means, respectively.

22. The apparatus of claim 1, wherein said screw conveyor comprises a plurality of solid core flights.

23. The apparatus of claim 22, wherein said plurality of screw conveyor solid core flights are capable of intermeshing rotatably.

24. The apparatus of claim 1, further comprising, means for collecting said media operatively disposed adjacent to said outlet to receive said decontaminated media as it exits therefrom.

25. An apparatus for the removal of higher and lower volatility organic contaminants from media contaminated therewith comprising:
a screw conveyor having an inlet, an outlet and one or more solid core flights;
means for collecting and delivering media contaminated with higher and lower volatility organic contaminants to said screw conveyor inlet;
at least one infrared radiation source external to said screw conveyor adapted to heat said media in said screw conveyor to a temperature above which at least one of said contaminants volatilize;
venting means for venting said volatilized contaminants from said screw conveyor; and
gas delivery means connected to said screw conveyor for delivering a gas therethrough, so that said gas flows through said conveyor in substantially the same direction as the movement of said media through said conveyor, whereby said delivered gas exits said screw conveyor by said venting means.

26. The apparatus of claim 25, further comprising secondary treatment means in communication with said venting means for processing said volatilized contaminants.

27. The apparatus of claim 25, wherein said gas delivery means controllably delivers said gas uniformly through said screw conveyor.

28. The apparatus of claim 25, wherein said gas is selected from the group consisting of oxidizing gases, reducing gases and inert gases.

29. The apparatus of claim 25, wherein said at least one infrared radiation source comprises a plurality of infrared radiation sources connected substantially along the entirety of at least one longitudinal surface of said screw conveyor.

30. The apparatus of claim 29, wherein said screw conveyor comprises a first heating zone and a second heating zone with said one or more solid core flights arranged to transport said contaminated media from said first zone to said second zone, said plurality of infrared radiation sources comprise a first infrared radiation source adapted to heat said media in said first zone of said screw conveyor to a first temperature and a second infrared radiation source adapted to heat said media in said second zone of said screw conveyor to a second temperature, and said venting means comprises first venting means for venting volatilized contaminants from said first zone of said screw conveyor and second venting means for venting volatilized contaminants from said second zone of said screw conveyor.

31. The apparatus of claim 30, wherein said second temperature is greater than said first temperature.

32. The apparatus of claim 31, wherein said first temperature is above the temperature at which said higher volatility organic contaminants volatilize and said second temperature is above the temperature at which said lower volatility organic contaminants volatilize.

33. The apparatus of claim 30, further comprising first secondary treatment means in communication with said first venting means and second secondary treatment means in communication with said second venting means.

34. The apparatus of claim 29, wherein said screw conveyor further comprises a third zone with said one or more solid core flights arranged to transmit said contaminated media from said second zone to said third zone, said plurality of infrared radiation sources further comprise a third infrared radiation source adapted to heat said media in said third zone of said screw conveyor to a third temperature, and said means for venting said volatilized contaminants further comprises a third means for venting volatilized contaminants from said third zone of said screw conveyor.

35. The apparatus of claim 34, wherein said third temperature is greater than said second temperature and said second temperature is greater than said first temperature.

36. The apparatus of claim 35, wherein said media contains water and said first temperature is above the temperature at which said water in said media volatilizes, said second temperature is above the temperature at which said higher volatility contaminants in said media that are less volatile than water volatilize, and said third temperature is above the temperature at which said lower volatility contaminants in said media volatilize.

37. The apparatus of claim 30, further comprising first, second and third secondary treatment means in communication with said first, second and third venting means, respectively.

38. The apparatus of claim 25, wherein said screw conveyor is a first screw conveyor with a first inlet and a first outlet, said infrared radiation source is a first infrared radiation source adapted to heat said media to a first temperature and said venting means is a first venting means, and said apparatus further comprises:
a second screw conveyor comprising a second inlet, a second outlet, and one or more solid core flights;
means for connecting said first outlet to said second inlet;
a second infrared radiation source, external to said second screw conveyor, adapted to heat said media in said second screw conveyor to a second temperature; and
second venting means for venting volatilized contaminants from said second screw conveyor.

39. The apparatus of claim 38, wherein said second temperature is greater than said first temperature.

40. The apparatus of claim 39, wherein said first temperature is above the temperature at which said higher volatility contaminants in said media volatilizes, and said second temperature is above the temperature at which said lower volatility contaminants volatilize.

41. The apparatus of claim 38, further comprising first and second secondary treatment means in communication with said first and second venting means, respectively.

42. The apparatus of claim 38, further comprising:
a third screw conveyor having a third inlet, a third outlet and one or more solid core flights;
means for connecting said third outlet to said second inlet;
a third infrared radiation source external to said third screw conveyor adapted to heat said media in said third screw conveyor to a third temperature; and
third venting means for venting said volatilized contaminants from said third screw conveyor.

43. The apparatus of claim 42, wherein said second temperature is greater than said third temperature.

44. The apparatus of claim 43, wherein said third temperature is above the temperature at which said higher volatility contaminants in said media volatilize, and said second temperature is above the temperature at which said lower volatility contaminants volatilize.

45. The apparatus of claim 42, further comprising first, second and third secondary treatment means in communication with said first, second and third venting means, respectively.

46. The apparatus of claim 25, wherein said screw conveyor comprises a plurality of solid core flights.

47. The apparatus of claim 46, wherein said plurality of screw conveyor solid core flights are capable of intermeshing rotatably.

48. The apparatus of claim 25, further comprising, means for collecting said media operatively disposed adjacent to said outlet to receive said decontaminated media as it exits therefrom.

* * * * *

UNITED STATES PATENT AND TRADEMARK OFFICE
CERTIFICATE OF CORRECTION

PATENT NO.   :   4,993,943

DATED        :   February 19, 1991

INVENTOR(S)  :   Norris et al.

It is certified that error appears in the above-identified patent and that said Letters Patent is hereby corrected as shown below:

```
Column 1, line 18, "no" should read --nor--.
Column 10, line 28, insert --.-- after "15".
Column 10, line 54, insert --.-- after "volatilize".
Column 11, line 14, insert --.-- after "228".
Column 11, line 18, insert --.-- after "vaporize".
Column 11, line 29, insert --.-- after "332".
Column 12, line 36, "connecting" should read --collecting--.
```

Signed and Sealed this

First Day of September, 1992

Attest:

DOUGLAS B. COMER

Attesting Officer

Acting Commissioner of Patents and Trademarks